United States Patent [19]
Walenta

[11] 3,796,246
[45] Mar. 12, 1974

[54] WELDED CHAIN LINK AND CHAIN

[76] Inventor: Gottfried Walenta, Baumschulgasse 14, Graz, Austria

[22] Filed: Oct. 20, 1972

[21] Appl. No.: 299,560

[30] Foreign Application Priority Data
Dec. 23, 1971 Austria .......................... 11102/71

[52] U.S. Cl................... 152/231, 152/243, 59/84
[51] Int. Cl............................................. B60c 27/00
[58] Field of Search.......... 59/84, 90; 152/231, 244, 152/243

[56] References Cited
UNITED STATES PATENTS
| | | | |
|---|---|---|---|
| 261,544 | 7/1882 | Gerhard | 59/84 |
| 878,990 | 2/1908 | Newhall | 59/84 |
| 1,743,497 | 1/1930 | Standish | 152/243 |
| 1,786,318 | 12/1930 | Stahl | 59/84 |
| 2,465,659 | 3/1949 | Parker | 152/243 |

Primary Examiner—Charles W. Lanham
Assistant Examiner—Gene P. Crosby
Attorney, Agent, or Firm—Ladas, Parry, Von Gehr, Goldsmith & Deschamps

[57] ABSTRACT

A non-skid chain for a tire is disclosed having a link construction of welded steel wire which is sustantially polygonal in cross-section perpendicular to the longitudinal direction of the link. The link cross-section has a cylindrical surface portion with two bearing surface portions located toward the inside of the link. Adjacent chain links are adapted to contact each other only at points disposed on the bearing surface portions between the links.

6 Claims, 19 Drawing Figures

WELDED CHAIN LINK AND CHAIN

This invention relates to a welded chain link which is made of steel wire having a substantially polygonal shape in cross-section and which is intended for non-skid chains and tire-protecting chains and can be made in large quantities on an automatic chain-making machine.

In modern road traffic, chains for vehicle tires are used not only in deep snow, where they were originally employed, but on an increasing scale also on smooth, firm and hard snow and icy roads. Whereas relatively thick chain links have been used before, which in most cases are twisted, the chain links have been made more recently from increasingly thinner wires in order to save weight and to improve the grip. Finally, wires were used as a starting material which were so thin that even if they consisted of stainless steel their ultimate strength was insufficient so that they were not highly satisfactory although these wires were well impressed by the vehicle tires even into hard snow and into ice and afforded a good grip. For this reason, somewhat thicker chain links have been employed and the chain was provided with a larger number of cross-members in order to avoid a reduction of the grip of a chain made from such links.

Because interconnected chain links which are made from wire that is round in cross-section are only in point contact with each other on their inside, so that they can easily rotate about their longitudinal axis even when the chain is taut, the chain links have been provided with backing rollers in order to avoid a canting of the links. That measure has proved quite satisfactory at low speeds of travel whereas at high speeds of travel the use of these backing rollers has adversely affected the smoothness of travel in an inconvenient manner so that the use of such rollers was also not entirely satisfactory. Other chains have been proposed which consisted of plates and rings in alternation. Whereas these chains did afford a good grip in deep snow, they were not very satisfactory on icy roads, in spite of the sharp edges of the plates, because the bearing surface of the plates was so long that it was difficult to impress the plates into ice. Besides, such chains are much heavier than the other non-skid chains and their manufacture is much more complicated and expensive because the conventional chain-making machines are not suitable for this purpose.

It is an object of the invention to provide a welded chain link which consists of steel wire and is intended for use in non-skid and tire-protecting chains and which is free of the drawbacks pointed out hereinbefore so that the chain link when connected to an adjacent chain link in a taut chain cannot substantially cant even when in contact with the tread of a vehicle tire. Besides, the chain link should consist of thin elements, be light in weight but have a high ultimate strength, and lend itself to being manufactured on a conventional automatic chain-making machine. The chain link should be designed to afford a good grip even on icy roads and should enable a convenient, smooth movement of the non-skid chain.

In a chain link of the kind defined first hereinbefore, these objects are accomplished in that the chain link has an inner portion which cooperates with identical chain links to be connected thereto and which is formed with a cylindrical surface that is centered on and symmetrical to the longitudinal and transverse center plane of the chain link and has an axis of curvature which is at right angles to said plane, and that the cylindrical surface is adjoined on both sides by laterally extending bearing surfaces, which intersect at arcs of a circle the cross-sections of the chain link in said portion so that the interengaging chain links contact each other only at points disposed on said bearing surfaces.

According to another feature of the invention, the radius of the arcuate intersections of the bearing surfaces is at least $r = (bi/2)$ and at most $r = 1.3\ (bi/2)$, where $bi$ is the inside distance between the sides of an oblong chain link.

According to a further feature of the invention, the bearing surfaces may be adjoined by surfaces which are symmetrical to and extend on both sides of the longitudinal and transverse center plane and are preferably parallel.

According to a still further embodiment of the invention, the chain link may be provided on the outside with grip-improving edges, in a manner known per se.

The invention will be described more fully hereinafter with reference to various embodiments of chain links which are diagrammatically shown on the drawing, in which.

Figure 1:
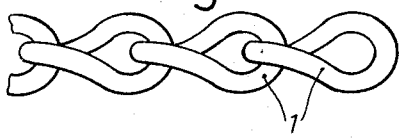
FIGS. 1 to 9 show respective embodiments of known chain links.
Figure 2:
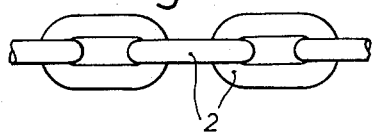

FIG. 1 shows several chain links 1, such as have been made as twisted links from relatively thick wire and used in snow chains. Such chains were very heavy and afforded only a poor grip. FIG. 2 shows thin chain links 2 which were made as untwisted links from high-grade steel wire which was only 3 millimeters in diameter. These links were used in non-skid chains for cars and as mentioned hereinbefore afforded a good grip but had only a low ultimate strength.

Figure 3:
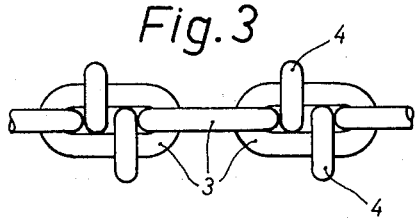
Figure 3A:
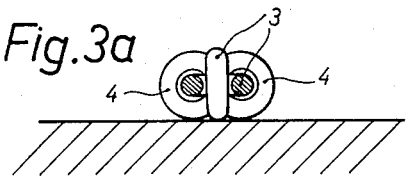
Figure 4:
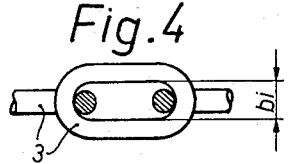
Figure 5:
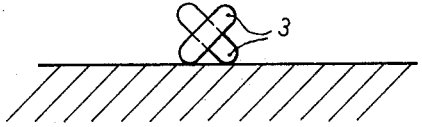
Figure 6:
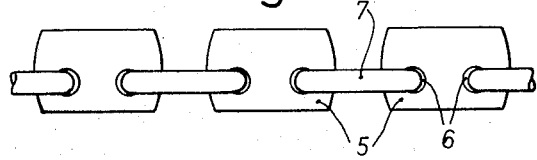
Figure 7:
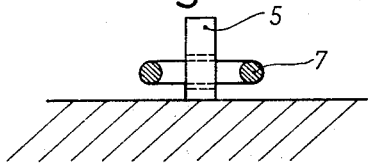
Figure 8:
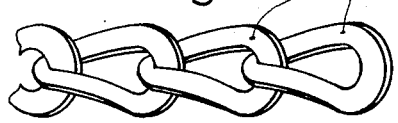

FIGS. 3 and 3a, respectively, are an elevation and a transverse sectional view showing known chain links 3, which are interconnected to form a portion of a non-skid chain. Those chain links which are arranged on edge on a tread of a tire are provided with backing rollers 4, which prevent a canting of these chain links. Such canting cannot be prevented, e.g., with chain links made from circular section wire, as shown in FIGS. 4 and 5, which links have no backing rollers and are only in point contact with each other on the cooperating inside surfaces of the chain links. Non-skid chains made from such chain links which are provided with backing rollers have proved quite satisfactory during a slow travel. At higher speeds, however, these chains greatly adversely affect the quiet running of the vehicle. FIGS. 6 and 7, respectively, are front and side elevations of a chain in which chain links 5 consisting of metal plates are disposed on edge on the tread of the tire and are connected by circular section chain links 7, which extend parallel to the tread and extend through holes 6 in the plates 5. These chains too have not proved satisfactory because the chain links disposed on edge cannot be sufficiently held in position so that they are liable to turn about their longitudinal axis. Besides, it has not been possible to make non-skid chains comprising such chain links in an automatic chain-making machine, as has been stated in the introductory part of the specification, so that these chains are relatively expensive. FIG. 8 shows a chain portion which comprises some interconnected, twisted chain links 8, which are made from a piece of wire which is substantially square in cross-section; such chains are mainly used with tractors. Chain links 9 made from square-section wire have also been used in chains which have been employed for considerable time as so-called ice chains for hauling lumber in mountainous areas or for cleaning the inside surfaces of barrels. Such chain links cannot be used in non-skid chains because the sharp edges of interconnected chain links would damage the chain links at their points of contact.

Figure 11:
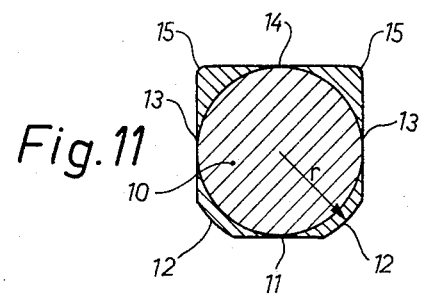
Figure 9:
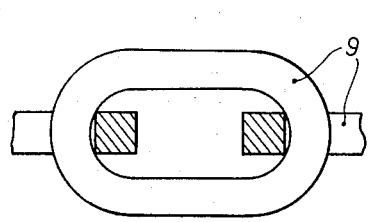
Figure 10:
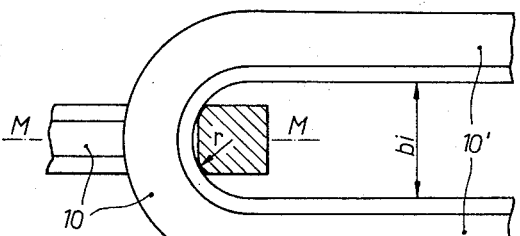

A first embodiment of the chain link according to the invention is shown in FIGS. 10 and 11. The chain links 10 are made on an automatic chain-making machine from steel wire which is substantially square in cross-section and have an inside surface portion which cooperates with an identical adjacent chain link 10. This portion comprises a cylindrical surface 11, which is centered on and symmetrical to the longitudinal and transverse center plane M—M of the chain link and is adjoined on both sides by outwardly extending bearing surfaces 12. The latter surfaces may be, e.g., conical or as shown in FIGS. 10 and 11 may have in cross-section the shape of an arc of a circle having a radius which is at least $r = (bi/2)$ and at most $r = 1.3\ (bi/2,\ )$ where $bi$ is the inside distance between the two sides 10' of an oblong chain link 10. The bearing surfaces 12 of the chain link 10 are adjoined on both sides of the longitudinal and transverse center plane by preferably parallel surfaces 13. The outside surface 14 of the chain link 10 is flat. These chain links have the special advantage that their inside surface is in contact with the next chain link at four points, namely, two pairs of points which are spaced from and symmetrical to the longitudinal and transverse center plane M—M. Because the chain links 10 differ in shape also on their outside from the circular transverse sectional shape which is still conventional with most known chain links, and the chain links are provided on the outside with edges 15, they may be used to great advantage in non-skid chains.

FIGS. 12 to 18 are transverse sectional views showing further embodiments of the chain link according to the invention. These chain links are also made from a profiled steel wire which is substantially rectangular in cross-section.

Figure 12:
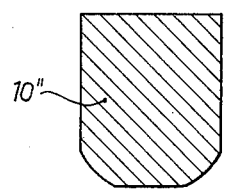
FIGS. 10 and 11 show a first embodiment of a chain link according to the invention and FIGS. 12 to 18 are transverse sectional views showing respective further embodiments of the chain link according to the invention.
Figure 13:
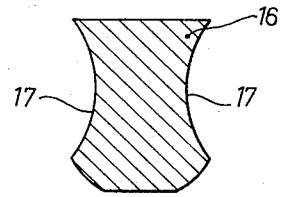
Figure 14:
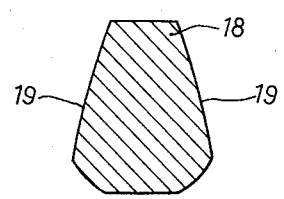

The chain link 10" shown in FIG. 12 is basically similar to the chain link 10 shown in FIGS. 10 and 11 and made from wire that is substantially square in cross-section. The chain link 16 shown in FIG. 13 comprises concave side faces 17 which result in a great saving of material and weight. In the chain link 18 shown in FIG. 14, the side faces 19 are cambered but converge toward the outside of the chain link so that the same is much narrower on the outside than on the inside. This design results also in a saving of material and weight and in an improved grip of the chain link. In the embodiment shown in FIG. 15, the chain link 20 is defined by side faces which are parallel and symmetrical to the longitudinal and transverse center plane M—M and has a concavely curved outside surface 21, which intersects the side faces at sharp edges which greatly improve the grip of the chain link.

Figure 15:
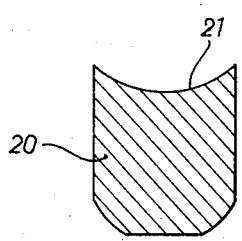
Figure 16:
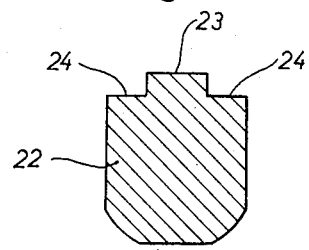
Figure 17:
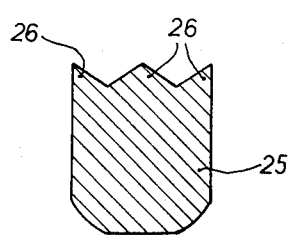
Figure 18:
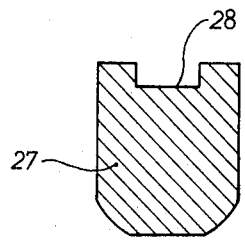

The further embodiments shown in FIGS. 16, 17, and 18 differ from the embodiment shown in FIG. 15 only in the design of the grip-improving edges on the outside of the chain link. The chain link 22 shown in FIG. 16 has on the outside a projecting portion 23, which is symmetrical to the longitudinal and transverse center plane M—M, and offset shoulders 24, which are symmetrical to the portion 23. The chain link 25 shown in FIG. 17 is provided on the outside with grooves which are symmetrical to the longitudinal and transverse center plane M—M and define three sharp grip-improving edges 26. In the embodiment shown in FIG. 18, the chain link 27 is provided on the outside with a central recess, which is symmetrical to the longitudinal and transverse center plane M—M and is defined by two protruding grip-improving edges.

What is claimed is:

1. A welded chain link, which consists of steel wire which is substantially polygonal in cross-section, said chain link defining a longitudinal and transverse center plane and comprising two opposite end portions, each of which has an inside surface which comprises a cylindrical surface portion that is centered on and symmetrical to said plane and has an axis of curvature which is at right angles to said plane, said inside surface further comprising two bearing surface portions, which adjoin said cylindrical surface portion on opposite sides of and are spaced from said plane and intersect transverse sectional planes of the respective end portion along arcs of a circle.

2. A chain link as set forth in claim 1, in which said two end portions are connected by side portions having transversely spaced apart inside surfaces, and the radius $r$ of said arcs of a circle is between $r = (bi/2)$ and $r = 1.3\ (bi/2)$, where $bi$ is the transverse spacing of said inside surfaces of said side portions, measured in said longitudinal and transverse center plane.

3. A chain link as set forth in claim 1, in which each of said end portions comprises side faces, which adjoin said bearing surface portions on the side thereof which is opposite to said cylindrical surface portion and are symmetrical to said longitudinal and transverse center plane.

4. A chain link as set forth in claim 3, in which said side faces are parallel to each other.

5. A chain as set forth in claim 1, which is formed on its outside with grip-improving edges.

6. A chain, which comprises at least two identical, welded chain links, each of which consists of steel wire which is substantially polygonal in cross-section, each of said chain links defining a longitudinal and transverse center plane and comprising two opposite end portions, each of which has an inside surface which comprises a cylindrical surface portion that is centered on and symmetrical to said plane and has an axis of curvature which is at right angles to said plane, said inside surface further comprising two bearing surface portions, which adjoin said cylindrical surface portion on opposite sides of and are spaced from said plane and intersect transverse sectional planes of the respective end portion along arcs of a circle, said chain links being interconnected so that said inside surface of an end portion of one chain link faces said inside surface of an end portion of an adjacent chain link,
said mutually facing inside surfaces of said adjacent chain links being adapted to contact each other only at points disposed on said bearing surface portions.

* * * * *